United States Patent
McVea et al.

(10) Patent No.: US 8,070,641 B2
(45) Date of Patent: Dec. 6, 2011

(54) DIFFERENTIAL GEAR ASSEMBLY

(75) Inventors: William Mark McVea, Camillus, NY (US); Michael Joseph Grieb, Marcellus, NY (US); Dana C. Clark, Trabuco Canyon, CA (US); Ronald E. Moser, San Juan Capistrano, CA (US)

(73) Assignee: Autotech Sport Tuning Corporation, Aliso Viejo, CA (US)

( * ) Notice: Subject to any disclaimer, the term of this patent is extended or adjusted under 35 U.S.C. 154(b) by 909 days.

(21) Appl. No.: 12/101,040

(22) Filed: Apr. 10, 2008

(65) Prior Publication Data

US 2009/0048056 A1  Feb. 19, 2009

Related U.S. Application Data

(60) Provisional application No. 60/955,831, filed on Aug. 14, 2007, provisional application No. 60/970,866, filed on Sep. 7, 2007, provisional application No. 60/983,883, filed on Oct. 30, 2007.

(51) Int. Cl.
*F16H 48/20* (2006.01)

(52) U.S. Cl. .................. 475/249; 74/337.5; 74/665 GD (58) Field of Classification Search .................. 475/248, 475/249, 252, 257; 74/650, 665 GD, 665 GA, 74/337.5
See application file for complete search history.

(56) References Cited

U.S. PATENT DOCUMENTS

| | | |
|---|---|---|
| 1,690,189 A | 11/1928 | Dennison |
| 2,850,922 A | 9/1958 | Welsh |
| 2,855,806 A | 10/1958 | Fallon |
| 2,932,218 A * | 4/1960 | Russell .......................... 475/234 |
| 3,375,736 A | 4/1968 | Saari |
| 3,587,346 A | 6/1971 | Koichi et al. |
| 4,041,804 A | 8/1977 | Clark |
| 5,122,102 A | 6/1992 | Chludek et al. |

(Continued)

FOREIGN PATENT DOCUMENTS

EP  0 130 806 A2  1/1985

(Continued)

OTHER PUBLICATIONS

European Search Report dated Dec. 18, 2008 in corresponding European Patent Application No. 08006568.3.

(Continued)

*Primary Examiner* — Justin Holmes
(74) *Attorney, Agent, or Firm* — Knobbe, Martens, Olson & Bear, LLP (57) ABSTRACT

A differential gear assembly is disclosed. The differential gear assembly includes a first sun gear and a second sun gear coaxially aligned with each other; a first set of planetary gears in mating engagement with the first sun gear; and a second set of planetary gears in mating engagement with the second sun gear. The first and second sets of planetary gears are in mating engagement with each other. The differential gear assembly also includes a first set of friction members, each of which faces a respective one of axial ends of the first set of planetary gears; and a second set of friction members, each of which faces a respective one of axial ends of the second set of planetary gears. The differential gear assembly further includes a first body connecting at least a plurality of said first set of friction members together, and a second body connecting at least a plurality of said first set of friction members together.

9 Claims, 10 Drawing Sheets

U.S. PATENT DOCUMENTS

| | | | |
|---|---|---|---|
| 5,139,467 A | 8/1992 | Carpenter | |
| 5,147,252 A | 9/1992 | Mace et al. | |
| 5,232,416 A | 8/1993 | Amborn et al. | |
| 5,302,159 A | 4/1994 | Dye et al. | |
| 5,415,601 A | 5/1995 | Cilano | |
| 5,443,431 A | 8/1995 | Cilano | |
| 5,464,084 A | 11/1995 | Aoki et al. | |
| 5,492,510 A | 2/1996 | Bowerman | |
| 5,531,653 A | 7/1996 | Barnholt | |
| 5,556,344 A | 9/1996 | Fox | |
| 5,658,214 A | 8/1997 | Hofstetter et al. | |
| 5,868,643 A | 2/1999 | Teraoka et al. | |
| 5,915,513 A | 6/1999 | Isley, Jr. et al. | |
| 5,951,426 A * | 9/1999 | Forrest | 475/88 |
| 6,634,979 B1 * | 10/2003 | Quaife | 475/249 |
| 6,974,401 B2 | 12/2005 | O'Leary et al. | |
| 7,022,041 B2 | 4/2006 | Valente | |
| 7,037,231 B2 | 5/2006 | Showalter | |
| 7,097,585 B2 | 8/2006 | Nishiji | |

FOREIGN PATENT DOCUMENTS

| | | |
|---|---|---|
| EP | 0 356 401 A2 | 2/1990 |
| JP | 58-221046 | 12/1983 |
| WO | WO 02/065000 A2 | 8/2002 |

OTHER PUBLICATIONS

International Search Report dated Dec. 19, 2008 in corresponding International Patent Application No. PCT/US2008/070368.

International Preliminary Report on Patentability dated Feb. 26, 2010 in corresponding International Patent Application No. PCT/US2008/070368.

Partial European Search Report dated Jul. 28, 2008 in corresponding European Application No. 08006568.3.

International Search Report and Written Opinion dated Oct. 26, 2009 in corresponding International Patent Application No. PCT/US2008/070368.

* cited by examiner

DIFFERENTIAL GEAR ASSEMBLY

CROSS-REFERENCE TO RELATED APPLICATIONS

This application claims the priority benefit under 35 U.S.C. §119(e) of U.S. Provisional Patent Applications No. 60/955,831, filed Aug. 14, 2007; No. 60/970,866, filed Sep. 7, 2007; and No. 60/983,883, filed Oct. 30, 2007, the full disclosures of which are incorporated herein by reference.

BACKGROUND OF THE INVENTION

1. Field of the Invention

The present invention generally relates to automobiles and, more specifically, to automobile differential gears.

2. Description of the Related Art

Generally, vehicles include a gear system to transmit rotational power from an engine to driven wheels. When a vehicle turns a corner, the driven wheels of the vehicle travel paths of different lengths, i.e., the wheel on the inside of the curve travels a shorter distance than the wheel on the outside of the curve. Thus, there is a need to provide different rotational speeds to the driven wheels in such an instance.

Figure 1:
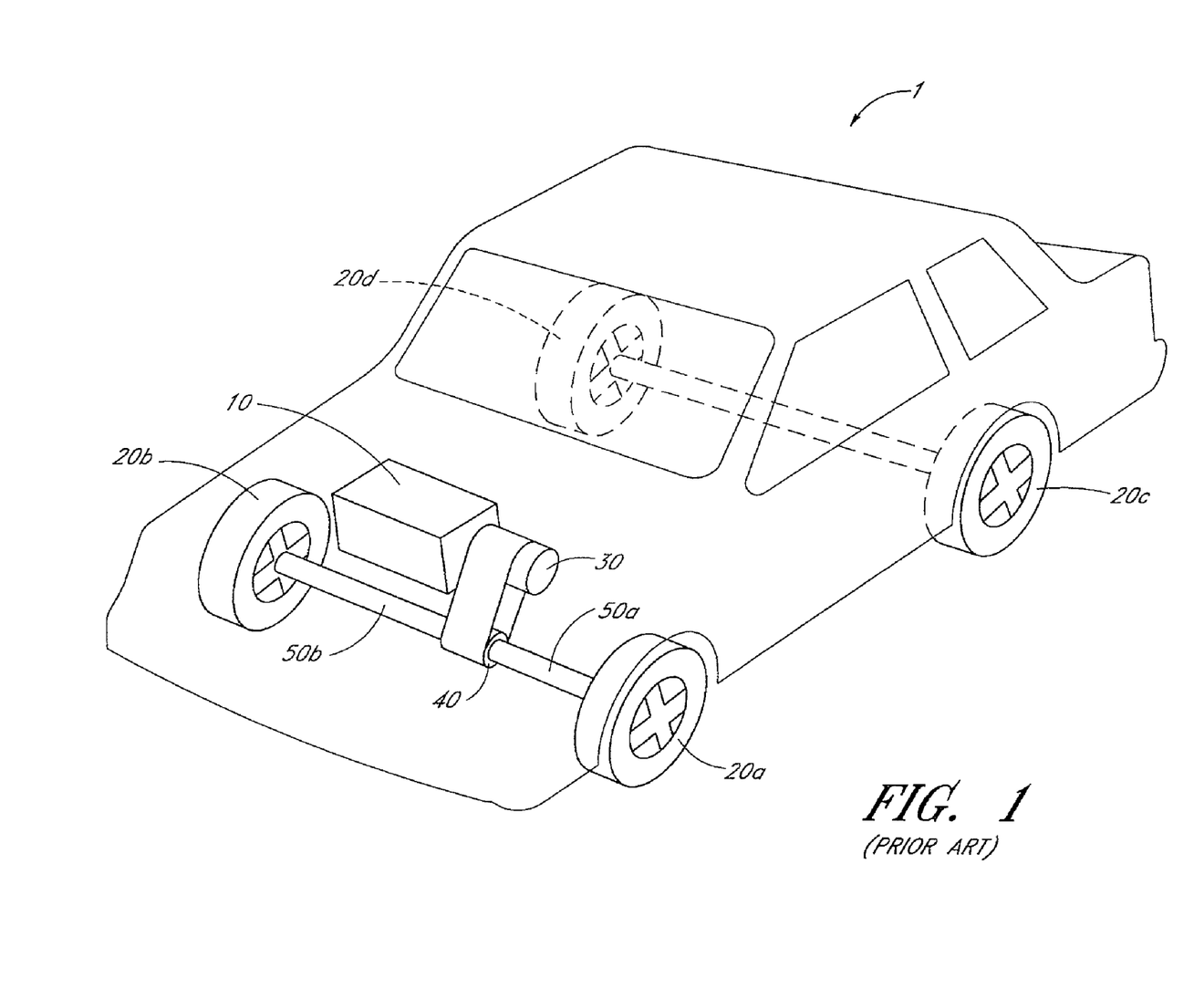
FIG. 1 is a schematic perspective view of a conventional automobile with a differential gear.

Typically, a vehicle employs a differential gear to allow the driven wheels of the vehicle to be driven at different rotational speeds. Referring to FIG. 1, a vehicle 1 includes an engine 10, wheels 20a-20d, a transmission 30, a differential gear 40, and wheel shafts 50a, 50b. The illustrated vehicle 1 is of a front wheel drive type, and thus the two front wheels 20a, 20b are driven. The transmission 30 transmits rotational power from the engine 10 to the driven wheels 20a, 20b via the differential gear 40 and the wheel shafts 50a, 50b. While the vehicle 1 is moving straight ahead, the differential gear 40 rotates the wheel shafts 50a, 50b at substantially the same speed. On the other hand, the differential gear 40 rotates the wheel shafts 50a, 50b at different speeds when the vehicle 1 turns a corner. The differential gear 40 is configured to accelerate the rotational speed of the wheel on the outside of the curve while decelerating the rotational speed of the wheel on the inside of the curve by an equal and opposite amount relative to the average rotational speed of the drive-line.

Even while traveling straight ahead, a vehicle may encounter a situation in which the driven wheels do not rotate at substantially the same speed. Such a situation typically occurs when the driven wheels experience different road surface conditions. For example, if one of the driven wheels is on an icy surface while the other is not, the wheel on the icy surface would overspin while reducing the rotational speed of the other wheel via the differential gear. Because the maximum transmitted torque of either axle shaft is limited by the maximum supported or sustained torque of the opposite axle shaft, the effect is that the torque on the well supported axle shaft decreases as the rotational speed of that axle shaft decreases. This effect manifests itself in situations which may result in a decrease in torque supplied to the other wheel. Thus, there is a need to provide a differential gear which can effectively provide torque to the well supported driven axle attached to the wheel that experiences high resistive loads (e.g. those with high coefficients of relative friction between the tire and road surface) when the set of driven wheels experience different road surface conditions.

SUMMARY OF THE INVENTION

An embodiment is a differential gear assembly. The differential gear assembly includes a first sun gear and a second sun gear coaxially aligned with each other. Each of the first and second sun gears has a central axis extending in a first direction. The differential gear also includes a first set of planetary gears in mating engagement with the first sun gear. Each of the first set of planetary gears has an axis extending in the first direction. Each of the first set of planetary gears having a first axial outer surface substantially perpendicular to the axis thereof. The first axial outer surface faces away from the second sun gear. The differential gear assembly further includes a second set of planetary gears in mating engagement with the second sun gear, wherein the first and second sets of planetary gears are in mating engagement with each other. Each of the second set of planetary gears has an axis extending in the first direction. Each of the second set of planetary gears has a second axial outer surface substantially perpendicular to the axis thereof. The second axial outer surface faces away from the first sun gear. The differential gear assembly further includes a first frictional interface to ground provided through friction members, each of which faces a respective one of the first axial outer surfaces of the first set of planetary gears; and a second set of frictional interface to ground provided through friction members, each of which faces a respective one of the second axial outer surfaces of the second set of planetary gears. The differential gear assembly further includes a first body connecting at least a plurality of said first set of friction members together; and a second body connecting at least a plurality of said first set of friction members together.

Another embodiment is a differential gear assembly including a first sun gear and a second sun gear spaced apart from each other and coaxially aligned with each other. The first sun gear includes a first surface facing the second sun gear. The second sun gear includes a second surface facing the first sun gear. The differential gear assembly further includes a preload or biasing member interposed between the first sun gear and the second sun gear. The preload member includes a third surface facing the first sun gear and a fourth surface facing the second sun gear. The preload member is designed and developed to provide torque bias between the two outputs of the system. Each of the first and third surfaces has a cam profile. Relative rotational movement of said first surface and said third surface causes axial movement of said first sun gear and said second sun gear. The second and fourth surfaces rotate relative to each other.

Yet another embodiment is a differential gear assembly including a first sun gear and a second sun gear spaced apart from each other and coaxially aligned with each other. The first sun gear includes a first surface facing the second sun gear. The second sun gear includes a second surface facing the first sun gear. The differential gear assembly further includes a preload or biasing member interposed between the first sun gear and the second sun gear. The preload member includes a third surface facing the first sun gear and a fourth surface facing the second sun gear. The first and third surfaces are shaped to cause said first sun gear and said second sun gear to move away from each other in response to relative rotational movement of said first sun gear and said preload member. The fourth surface forms a substantially planar frictional surface.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENT

Differential Gear Assembly

As described above, there is a need to provide differential action (or motion) which can effectively provide torque to the driven wheels when the driven wheels experience different road surface conditions. In one embodiment, a differential gear is configured to provide friction therein so as to retard an increase in the rotational speed of the slipping wheel of the driven wheel set. This configuration effectively reduces a decrease in the torque of the other non-slipping driven wheel, thereby reducing a decrease in torque supplied to the non-slipping wheel.

Figure 2:
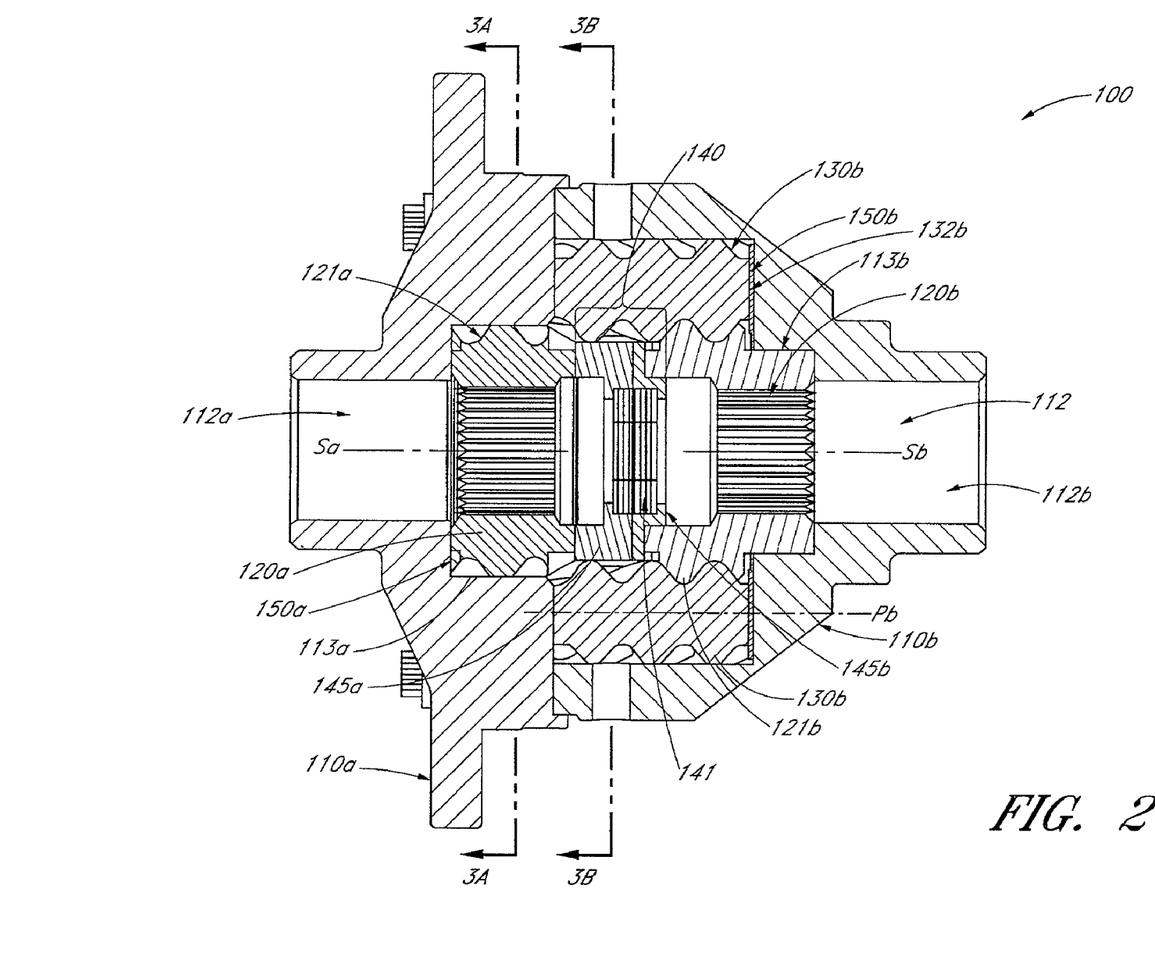
FIG. 2 is a cross-section of a differential gear assembly according to one embodiment.
Figure 3A:
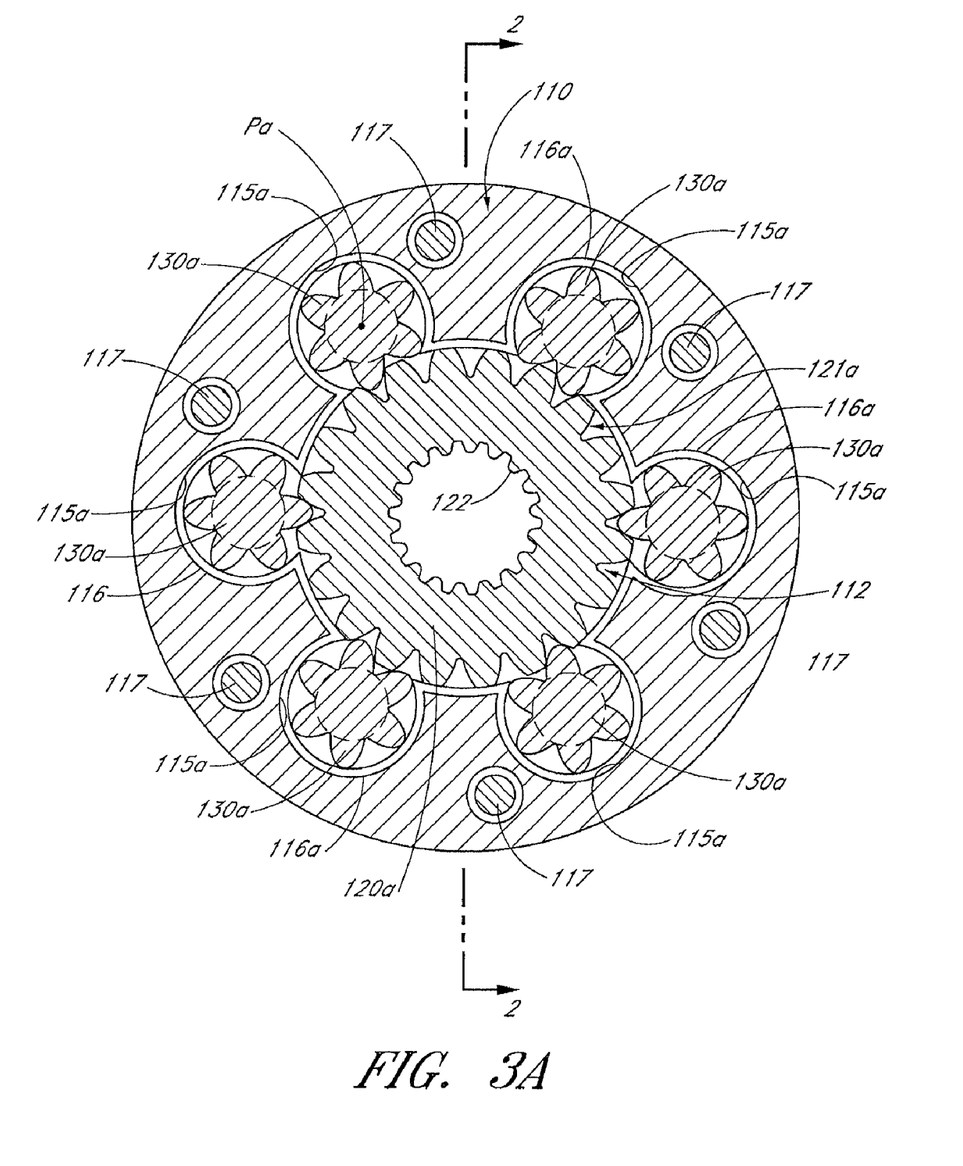
FIG. 3A is a cross-section of the differential gear assembly of FIG. 2, taken along line 3A-3A.
Figure 3B:
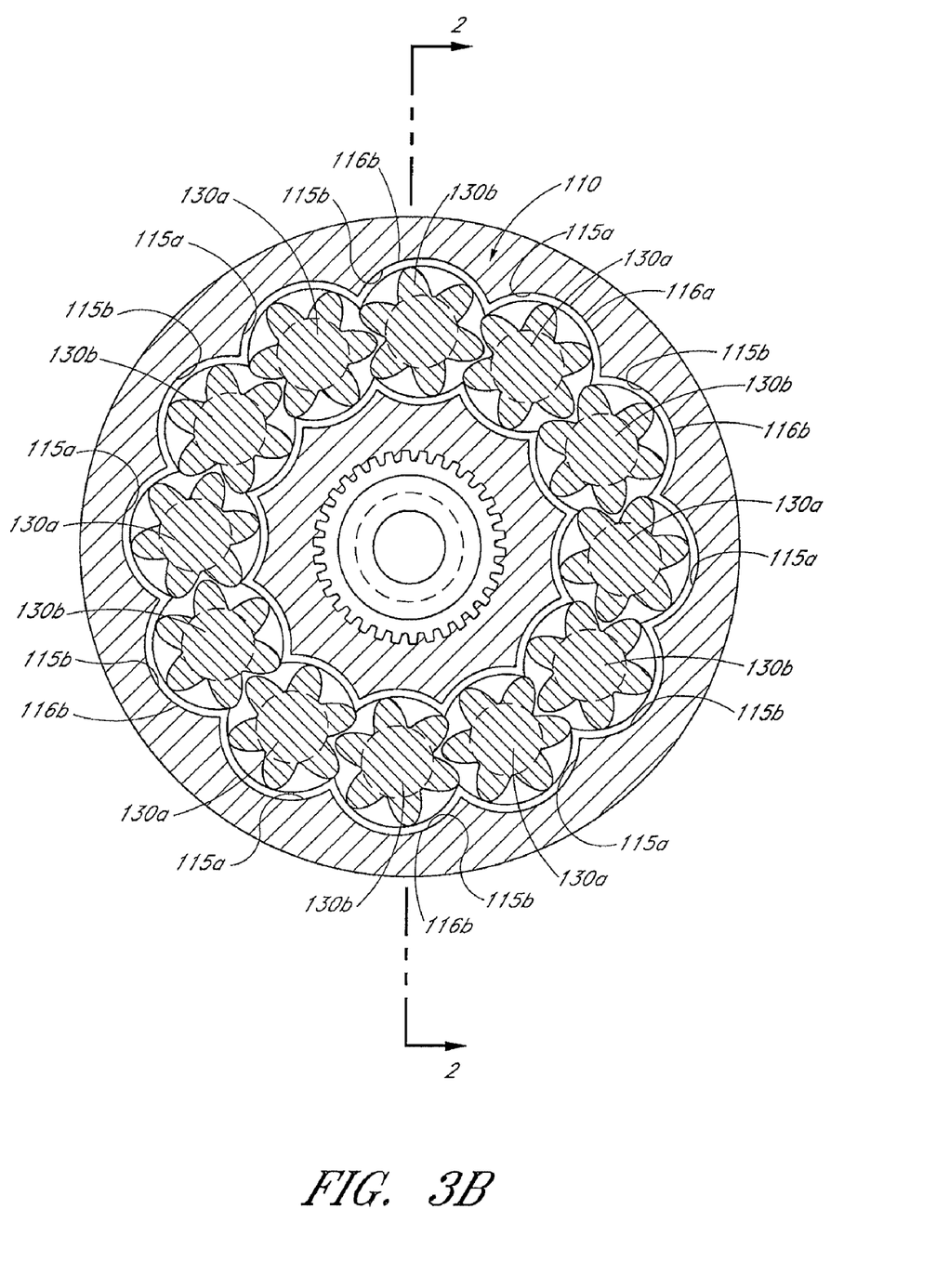
FIG. 3B is a cross-section of the differential gear assembly of FIG. 2, taken along line 3B-3B.
Figure 4:
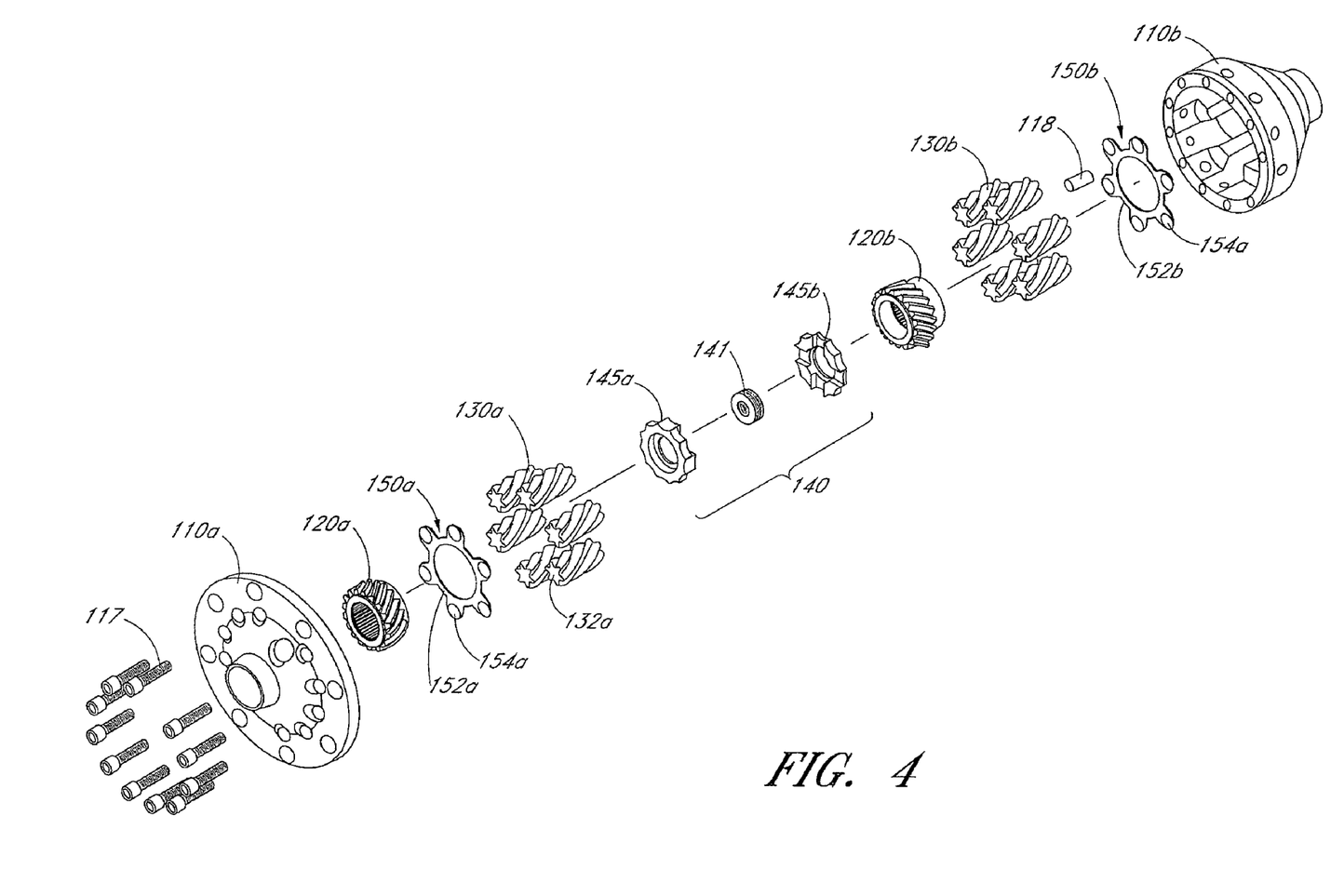
FIG. 4 is an exploded perspective view of the differential gear assembly of FIG. 2.

FIGS. 2-3B illustrate a differential gear assembly 100 for use in a vehicle. FIG. 4 illustrates the same differential gear assembly 100 in a disassembled form. The vehicle can be one of a front wheel drive type, rear wheel drive type, and four wheel drive type.

Referring to FIG. 2, the illustrated differential gear assembly 100 includes a casing 110 which includes a flange end housing 110a and a small end housing 110b. The flange end housing 110a and the small end housing 110b are rigidly coupled to each other by bolts 117 (FIG. 3A) and a locking pin 118 (FIG. 4). The number of the bolts 117 and the locking pin 118 can vary widely depending on the design of the casing 110.

The flange end housing 110a and the small end housing 110b define an inner cylindrical channel 112 (FIG. 2). Each end 112a, 112b of the channel 112 is shaped to receive a half shaft (not shown; e.g., the wheel shafts 50a, 50b of FIG. 1) to which a driven wheel of the vehicle is attached. In addition, the flange end housing 110a and the small end housing 110b are together configured to house various members including a first side gear 120a, a second side gear 120b, a first plurality of pinion gears 130a, a second plurality of pinion gears 130b (FIG. 3B), a center preload or biasing assembly 140, a first friction plate 150a, and a second friction plate 150b.

Referring to FIG. 3A, the first side gear 120a serves as a sun gear while the first plurality of pinion gears 130a function as planetary gears surrounding the first side gear 120a in meshing engagement therewith. Similarly, the second side gear 120b serves as another sun gear while the second plurality of pinion gears 130b (FIG. 3B) function as planetary gears surrounding the second side gear 120b in meshing engagement therewith. Referring back to FIG. 2, the first side gear 120a and the second side gear 120b are coaxially aligned with each other. Each of the first and second side gears 120a, 120b has a central axis Sa, Sb extending therethrough in a first direction.

In the illustrated embodiment, the first side gear 120a includes outer helical teeth 121a, each of which defines a helix angle as viewed from the outer axial end of the first side gear 120a. The second side gear 120b has outer helical teeth 121b, each of which defines another helix angle as viewed from the same reference point. The first side gear 120a is maintained within the casing 110 by a cylindrical recess 113a of the flange end housing 110a. The second side gear 120b is maintained within the casing 110 by a cylindrical recess 113b of the small end housing 110b.

Each of the first and second side gears 120a, 120b is attached to a respective one of the half shafts in a rotationally fixed manner such that the side gears 120a, 120b and the half shafts rotate at the same rotational speed. Preferably, each of the first and second side gears 120a, 120b has a splined interior surface 122 (FIG. 3A) that mates with a complementary splined exterior surface of each of the half shafts. The first and second side gears 120a, 120b are rotatably mounted in the channel 112, so that the first and second side gears 120a, 120b and the half shafts are rotatable with respect to the casing 110.

Referring to FIG. 3A, the illustrated casing 110 includes a first set of six cylindrical pockets 115a defined by pocket walls 116a formed in the casing 110. Each of the pockets 115a forms a partially formed circle or truncated circle, as shown in FIG. 3A. The pockets 115a are arranged in a circle around the axis of rotation of the casing 110, the side gears 120a, 120b, and the half shafts with either equal or unequal angular spacing. The first set of pockets 115a are formed by aligned axial bores in the flange end housing 110a. In other embodiments, the pockets 115a may have non-cylindrical shapes, non-uniform sizes, diameters or lengths and non-uniform relative positions. Each pocket 115a is sized and adapted to enclose a respective one of the first plurality of pinion gears 130a pocketed (or positioned) therein, such that a first set of six pinion gears 130a are provided. Each of the first plurality of pinion gears 130a includes helical teeth, each of which defines an angle as viewed from the outer axial end of the first side gear 120a. The first plurality of pinion gears 130a are in meshing engagement with the first side gear 120a, as shown in FIG. 3A.

Referring to FIG. 3B, the illustrated casing 110 also includes a second set of six cylindrical pockets 115b defined by pocket walls 116b formed in the casing 110. Each of the pockets 115b forms a partially formed circle or truncated circle, as shown in FIG. 3B. The pockets 115b are arranged in a circle around the axis of rotation of the casing 110, the side gears 120a, 120b, and the half shafts. The pockets 115b are formed by aligned axial bores in the small end housing 110b. In other embodiments, the pockets 115b may have non-cylindrical shapes, non-uniform sizes, diameters or lengths and non-uniform relative positions. Each pocket 115b is sized and adapted to enclose a respective one of the second plurality of pinion gears 130b pocketed (or positioned) therein, such that a second set of six pinion gears 130a are provided. Each of the second plurality of pinion gears 130b includes helical teeth, each of which defines an angle as viewed from the outer axial end of the second side gear 120b. The second plurality of pinion gears 130b is in meshing engagement with the second side gear 120b.

Each of the first plurality of pinion gears 130a has an axis Pa (FIG. 3A) extending therethrough in the first direction in which the axes Sa, Sb (FIG. 2) of the side gears 120a, 120b extend. Each of the first plurality of pinion gears 130a has a pair of end surfaces, one of which defines an axial outer surface 132a (FIG. 2) substantially perpendicular to the axis Pa thereof. The axial outer surface 132a of each of the first plurality of pinion gears 130a faces away from the second side gear 120b. Similarly, each of the second plurality of pinion gears 130b has an axis Pb (FIG. 2) extending therethrough in the first direction in which the axes Sa, Sb of the side gears 120a, 120b extend. Each of the second plurality of pinion gears 130b has a pair of end surfaces, one of which defines an axial outer surface substantially perpendicular to the axis Pb thereof. The axial outer surface 132b of each of the second plurality of pinion gears 130b faces away from the first side gear 120a.

Also, as best seen in FIG. 3B, each of the pockets 115a, 115b intersects with two neighboring pockets 115b, 115a, and vice-versa. Each of the pinion gears 130a, 130b is in meshing engagement with two neighboring pinion gears 130b, 130a, and vice-versa. Thus, as well known in the art, as one set of pinion gears 130a, 130b rotates in a first direction, the other set of pinion gears 130b, 130a rotates in the opposite direction.

Center Preload Assembly

Figure 5A:
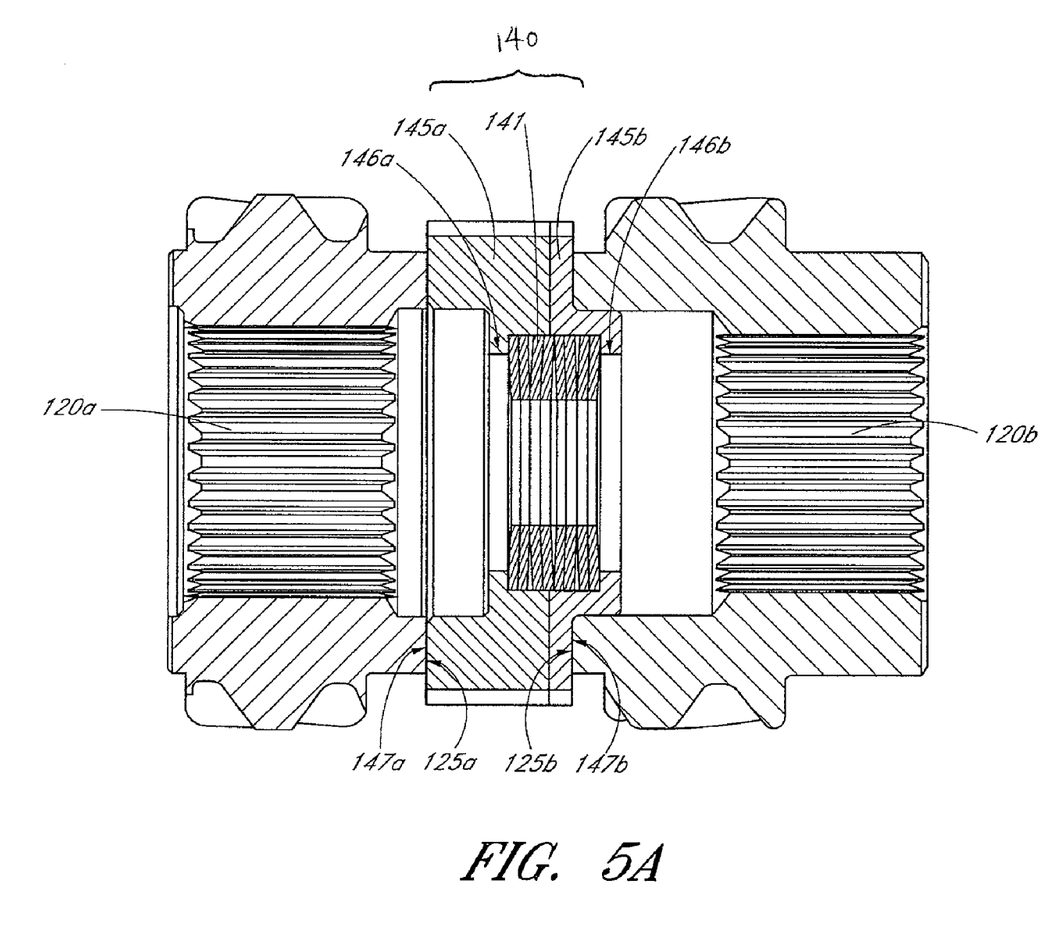
FIG. 5A is a side view of one embodiment of a center preload or biasing assembly and side gears.
Figure 5B:
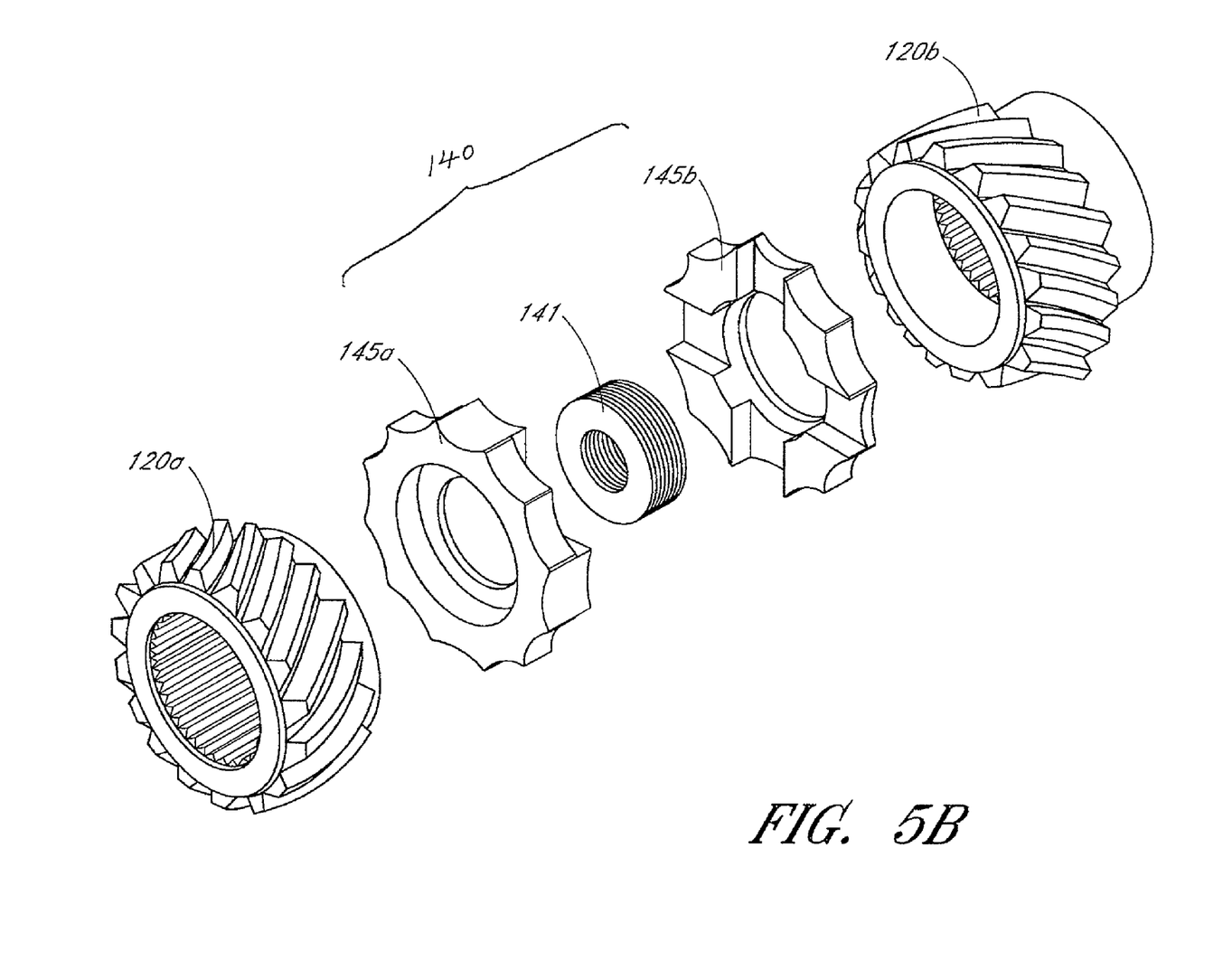
FIG. 5B is an exploded perspective view of the center preload assembly and side gears of FIG. 5A.

Referring to FIGS. 5A and 5B, the first and second side gears 120a, 120b are separated by the center preload or biasing assembly 140. The first side gear 120a includes a first annular side surface 125a facing the second side gear 120b while the second side gear 120b includes a second annular side surface 125b facing the first side gear 120b. Each of the annular side surfaces 125a, 125b is defined on the outermost portion of each of the side gears 120a, 120b from which gear teeth extend. The illustrated preload assembly 140 includes a spring pack 141, a first preload hub 145a, and a second preload hub 145b. The spring pack 141 is interposed between the first preload hub 145a and the second preload hub 145b. Each of the first preload hub 145a and the second preload hub 145b includes an internal annular ridge 146a, 146b on its inner axial side such that the two ridges form a recess for receiving the spring pack 141. The first preload hub 145a includes a first annular hub side surface 147a facing the first surface 125a of the first side gear 120b. The second preload hub 145b includes a second annular hub side surface 147b facing the second surface 125b of the second side gear 120b. The first and second preload hubs 145a, 145b impart a tangential torque due to friction on the axial ends of the first side gear 120a and the second side gear 120b, respectively. This configuration retards the rotation of the side gears 120a, 120b, as will be better understood from description below with respect to the operation of the differential gear assembly 100.

The spring pack 141 may include, for example, Belleville type disc springs or a coil spring, or any other energy storage device. The spring pack 141 provides a normal force which biases the first and second preload hubs 145a, 145b axially outward against the first and second side gears 120a, 120b, respectively. The normal force generated by the spring pack 141 thus produces a normal force in an axial direction between one of the two side gears 120a, 120b and a respective one of the preload hubs 145a, 145b. In this case, the normal force is a net force compressing the two parallel surfaces 125a and 147a, or 125b and 147b together in a direction perpendicular to the surfaces. This normal force multiplied by the coefficient of friction of the two rotating members (i.e., the first side gear 120a and the first preload hub 145a; the second side gear 120b and the second preload hub 145b) produces a resistive force. This resistive force multiplied by the mean radius of the frictional surface on each of the side gears 120a, 120b generates a resistive torque which creates the biasing effect at (or near) zero driveline torque condition. The term "zero driveline torque condition" refers to a situation in which no torque is supplied to at least one of driven wheels, for example, when a driven wheel is slipping on a slippery surface.

Friction Plates

Figure 6:
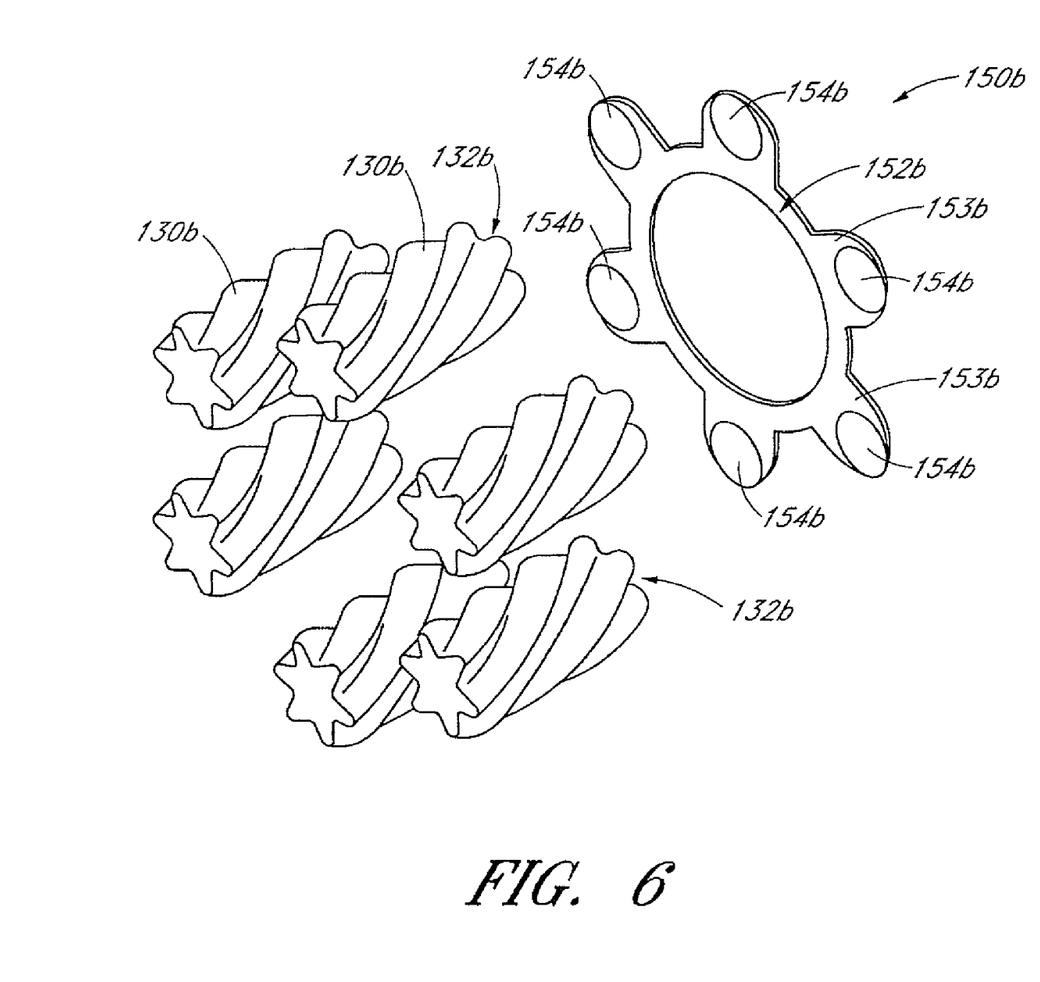
FIG. 6 is an exploded perspective view of one embodiment of pinion gears and a friction plate.

Referring to FIGS. 2, 4, and 6, the configurations of the first and second friction plates 150a, 150b will now be described in detail. The first and second friction plates 150a, 150b serve to provide a controllable and definable coefficient of friction, through which drive-line torque management and biasing can be designed specific to differential operation. The friction plates serve to dissipate the rotational energy of the first and second sets of the pinion gears 130a, 130b as heat, respectively. In the illustrated embodiment, the first friction plate 150a is shaped and positioned to contact the axial outer surfaces 132a of the first set of pinion gears 130a. The second friction plate 150b is shaped and positioned to contact the axial outer surfaces 132b of the second set of pinion gears 130b. Preferably, the friction plates 150a, 150b are secured from rotation with respect to the casing 110 by design.

The first and second friction plates 150a, 150b support a friction material such to provide a coefficient of friction on the axial outer surfaces 132a, 132b of the first and second sets of pinion gears 130a, 130b, respectively. As will be better understood from description below with respect to the operation of the differential gear assembly 100, as the pinion gears 130a, 130b exert thrust load on the friction plates 150a, 150b, friction developed between the pinion gears 130a, 130b and the friction plates 150a, 150b reduces the spin rate of the pinion gears 130a, 130b relative to the casing 110. This configuration effectively reduces the amount a set of pinion gears, coupled to a slipping driven wheel, will spin, thereby increasing the torque transmitted to the other set of the pinion gears coupled to the other non-slipping driven wheel. By selecting a material having a desired coefficient of friction for the friction plates 150a, 150b, the differential gear assembly can be tuned for a given application.

As shown in FIG. 4, the first friction plate 150a can have, but are not required to have, the same configuration as the second friction plate 150b. Each of the first and second friction plates 150a, 150b has a petal form or a sun flower form. Each of the first and second friction plates 150a, 150b includes a ring-shaped body 152a, 152b and friction pad portions 154a, 154b. The ring-shaped body 152a, 152b includes a plurality of protrusions 153a, 153b extending radially outward from the body 152a, 152b. The protrusions are spaced such that the friction material is placed centroidially to the axial face of the pinions. The pad portions 154a, 154b can be coupled to the protrusions 153a, 153b. A skilled artisan will appreciate that the friction pad portions 154a, 154b can be coupled to the body 152a, 152b in various manners.

Each of the pad portions 154a of the first friction plate 150a is configured to contact a respective one of the axial outer surfaces 132a of the first set of pinion gears 130a (FIG. 4). Similarly, each of the pad portions 154b of the second friction plate 150b is configured to contact a respective one of the axial outer surfaces 132b of the second set of pinion gears 130b. The configurations of the first and second friction plates 150a, 150b allow a quick replacement of the pad portions 154a, 154b because the pad portions 154a, 154b are attached to the bodies 152a, 152b. In addition, because the pad portions 154a, 154b are fixed to the bodies 152a, 152b, the pad portions 154a, 154b do not spin during operation, thus providing uniform exposure to the friction effect of the material to generate a constant friction force in a desired amount to the pinion gears 130a, 130b. In other embodiments, the body 152a, 152b may be shaped to connect a plurality, but not all of the friction pad portions 154a, 154b.

The first and second friction plates 150a, 150b may be formed of an engineered friction material (e.g., steel, and carbon fiber). The friction material may have a frictional coefficient adapted for the types and usages of vehicles. In one embodiment, the friction material may have a friction coefficient of about 0.01 to about 0.70, preferably about 0.10 to about 0.20. Examples of the friction material include, but are not limited to: Kevlar, carbon, brass, bronze, semi-metallic, etc.

In other embodiments, only the pad portions 154a, 154b of the friction plates 150a, 150b may be formed of the engineered friction material. In such embodiments, the body 152a, 152b may be formed of a non-frictional material. A skilled artisan will appreciate that various other configurations of friction plates can be adapted for use with the differential gear assembly 100. A skilled artisan will also appreciate that any number of differential pinions and friction sets can be provided.

Operation of Differential Gear Assembly

In operation, a vehicle including the differential gear assembly 40 (FIG. 1) delivers power to a pair of driven wheels through the differential gear assembly 100 (FIG. 2). The differential gear assembly 100 divides the vehicle's power between the driven wheels to suit the driving conditions. The vehicle's transmission transmits torque from the engine to the casing 110a directly and then through the bolts 117 to the small end housing 110b indirectly, causing the casing 100 to rotate about the axis of rotation of the wheels. The casing 110 then pushes on the pinion gears 130a and 130b, which cause them to revolve around the same axis. Since the pinion gears 130a, 130b are in meshing engagement with the side gears 120a and 120b, the circular movement of the pinion gears 130a, 130b causes the side gears 120a, 120b to rotate, along with the half shafts and wheels.

When the vehicle is traveling straight ahead without loss of traction, the wheels of the vehicle rotate at substantially equal speeds. In this condition, the vehicle's power is split substantially equally between the two wheels. The pinion gears 130a, 130b revolve about the side gears 120a, 120b, but do not spin about their individual axes. Thus, the side gears 120a, 120b each rotate at substantially the same speed as each other and the casing 110.

When the vehicle is driving along a curve, the wheels rotate at different speeds. The wheel on the inside of the curve ("the inner wheel") rotates at a lower speed than the wheel on the outside of the curve ("the outer wheel"). For example, suppose that the inner wheel is the wheel connected to the first side gear 120a, and that the outer wheel is the wheel connected to the second side gear 120b. The first set of pinion gears 130a, which are in meshing engagement with the first side gear 120a, spin about their axes in the direction of wheel rotation. The second set of pinions gears 130b, which are in meshing engagement with the first set of pinion gears 130a and with the second side gear 120b, spin about their axes in a direction opposite to the direction of wheel rotation. The rotations of the first and second sets of pinion gears 130a, 130b in the opposite directions serve to transmit different torques to the inner wheel and the outer wheel. When the first and second sets of pinion gears 130a, 130b rotate in the opposite directions, they tend to produce axial thrust against the contacting surfaces of the casing 110 because they are helical gear pairs engaged with each other.

In certain circumstances, the vehicle's two driven wheels may experience different amounts of friction with road surfaces. In one instance, one of the wheels ("the slipping wheel") may be on an icy patch or in mud while the other wheel ("the non-slipping wheel") is on a normal road surface. In another instance, when the vehicle is driving along a curve, the wheel on the inside of the curve ("the inner wheel") may be lifted up from the road surface while the wheel on the outside of the curve ("the outer wheel") closely contacts the road surface.

Suppose, for example, that the slipping wheel is connected to the first side gear 120a. In the absence of the friction plates 150a, 150b, the slipping wheel would overspin, and the first side gear 120a in meshing engagement with the slipping wheel would also overspin. This causes the first set of pinion gears 130a to rotate about their axes in a direction opposite to the direction of the slipping wheel's rotation, thereby causing the second set of pinion gears 130b to rotate about their axes in the direction of the non-slipping wheel's rotation. Such rotation of the second set of pinion gears 130b would cause the second side gear 120b to rotate in a direction opposite to the direction of the non-slipping wheel's rotation. This would result in transmitting most of torque from the engine to the slipping wheel while providing substantially no torque to the non-slipping wheel, and thus cannot produce motive force.

The friction plates 150a, 150b in conjunction with the normal or axial thrust generated by the pinions, create a secondary resistive torque that in turn acts to reduce the rotational action of the differential gear assembly 100 in such circumstances. When the first and second sets of pinion gears 130a, 130b rotate in opposite directions, they produce axial thrust against the contacting surfaces of the casing 110, as described above. The friction plates 150a, 150b are positioned to form the contacting surfaces of the casing 110. The contact of the first and second sets of pinion gears 130a, 130b with the friction plates 150a, 150b, respectively, creates a resistive torque (or friction force) that reduces the rotation of the first and second sets of pinion gears 130a, 130b. Thus, the differential action of the differential gear assembly 100 can be reduced and controlled via engineering principals. This configuration in effect allows the non-slipping wheel to increase torque, and thus the non-slipping wheel can provide enough torque to move the vehicle.

The side gears 120a, 120b can produce an axial thrust as a function of applied torque, which in turn becomes an additive force through the center preload or biasing assembly 140. This combined normal force can add to a static (no load) preload, which increases the bias ratio between the two driven wheels. In addition, the applied torque load can manifest itself as an axial force from the pinion gears 130a, 130b into the casing 110. This axial force is an additive force to the preload force into the friction plates 150a, 150b. The axial force, as a function of the effective coefficient of friction, will provide a resistive torque against the rotational motion of the pinion gears 130a, 130b. The resistive torque adds to the resistance of relative rotation of all components within the differential gear assembly 100.

In one embodiment, the bias ratio between two driven wheels can be tuned by selecting a material having a desired coefficient of friction for the friction plates 150a, 150b, and/or the preload hubs 145a, 145b. A set of engineered friction materials, if used for the friction plates 150a, 150b and/or the preload hubs 145a, 145b, can provide a mechanism to tune the response of the differential gear assembly 100 as a function of applied torque load and speed difference. The resistive force generated by the center preload assembly 140 and the friction plates 150a, 150b, is non-constant since it is a function of the axial forces from the sets of pinion gears 130a, 130b. The unbalance of the resistive torque manifests as non-constant energy absorption within the differential gear assembly 100, causing a torque bias, which in effect minimizes reduction of torque transmitted to the non-slipping wheel.

The configuration of the differential gear assembly 100 provides a means to tune the torque bias ratio between the wheels as well as a torque bias ratio at a "zero torque" condition (which exists when there is no load applied through the drive train at a vehicle stationary or transitioning from driving to braking or back).

Center Preload Assembly with Cam Profiles

Figure 7A:
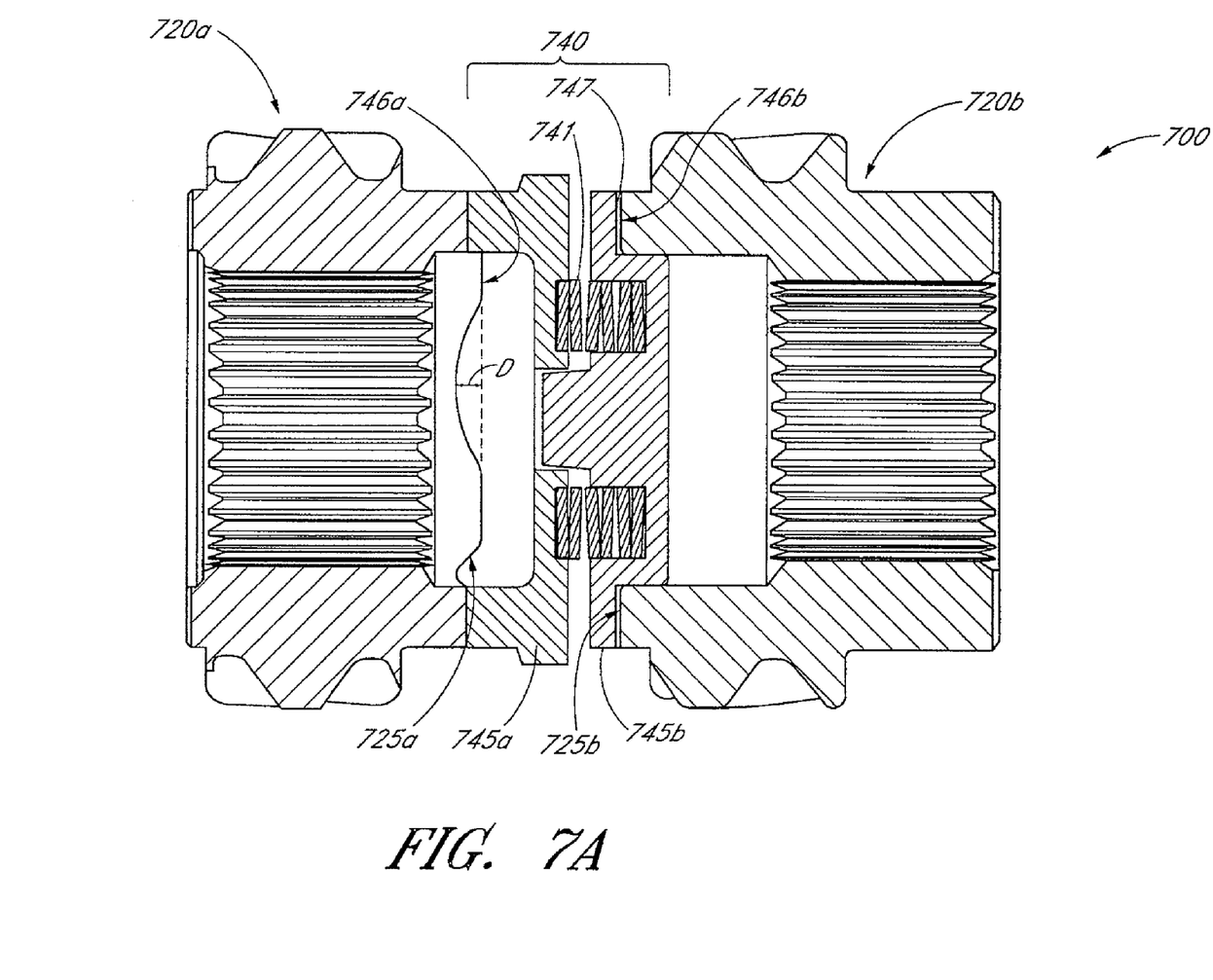
FIG. 7A is a side view of another embodiment of a center preload assembly and side gears having cam profiles.
Figure 7B:
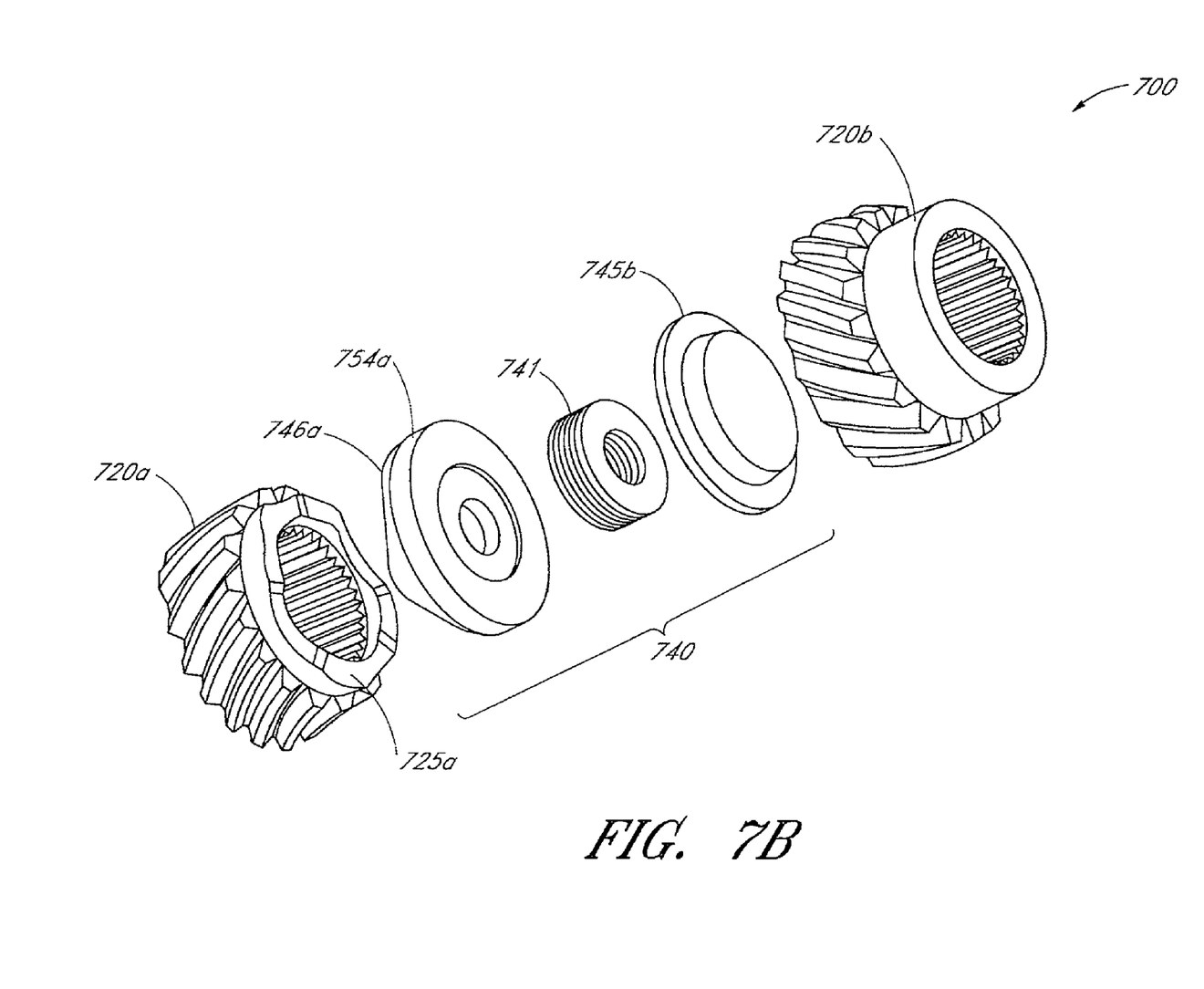
FIG. 7B is an exploded perspective view of the center preload assembly and side gears of FIG. 7A.

FIGS. 7A and 7B illustrate another embodiment of a differential gear 700. The differential gear 700 includes a first side gear 720a, a second side gear 720b, and a center preload or biasing assembly 740. Other components (e.g., a casing and pinion gears) of the differential gear 700 are omitted for the sake of clarity. Half shafts (not shown) are engaged with the first and second side gears 720a, 720b. The preload assembly 740 includes a first preload hub 745a, a second preload hub 745b, and a spring pack 741 interposed between the preload hubs 745a, 745b. The first and second preload hubs 745a, 745b may be secured to each other by a pin (not shown) penetrating through such that they do not rotate relative to each other. The preload assembly 740 is interposed between the first and second side gears 720a, 720b. The configurations of the side gears 720a, 720b, the casing, and the pinion gears can be as described above with respect to FIG. 2.

The preload assembly 740 and at least one of the side gears 720a, 720b have complementary wave or cam profiles at the interface therebetween. In the illustrated embodiment, the first side gear 720a has an annular side surface 725a facing and contacting the first preload hub 745a. The side surface 725a of the first side gear 720a has a first series of converging and diverging cam (wave) profiles. In one embodiment, the cam profiles have a rise of about 0.05 mm to about 0.15 for a relative angular rotation of about 30 to about 60 degrees. The term "rise" refers to a degree D (FIG. 7A) of protrusion of the converging portion of a cam profile.

The first preload hub 745a also has an annular side surface 746a facing and contacting the side surface 725a of the first side gear 720a. The side surface 746a of the first preload hub 745a includes a second series of converging/diverging cam (wave) profiles. The second series of cam profiles can be complementary to the first series of the cam profiles. The cam profiles can form a continuous curve, facilitating sliding movement between the side surface 725a of the first side gear 720a and the side surface 746a of the first preload hub 745a.

In the illustrated embodiment, the second side gear 720b has an annular side surface 725b facing and contacting the second preload hub 745a. The second preload hub 745b has an annular side surface 746b facing and contacting the side surface 725b of the second side gear 720b. The side surfaces 725b, 746b of the second side gear 720b and the second preload hub 745b are preferably substantially flat while forming high frictional surfaces. The side surface 746b of the second preload hub 745b may be formed of a material having a coefficient of friction of about 0.01 to about 0.70, preferably about 0.10 to about 0.20. In the illustrated embodiment, the second preload hub 745b includes a separate friction layer 747 forming a surface with a high coefficient of friction. In another embodiment, a separate layer with a high coefficient of friction may be applied to the side surface 725b of the second side gear 720b. In certain embodiments, each of the side surfaces 725b, 746b of the second side gear 720b and the second preload hub 745b may be provided with a surface with a high effective coefficient of friction.

During operation, while a vehicle including the differential gear 700 is turning a corner, the two side gears 720a, 720b rotate at different speeds. In this situation, the second side gear 720b rotates relative to the second preload hub 745b while the first side gear 720a does not rotate relative to the first preload hub 745a. The first and second preload hubs 745a, 745b do not rotate relative to each other.

In certain circumstances, the vehicle's two driven wheels may experience substantially no friction from a road surface. In one instance, both of the wheels may be on an icy patch or in mud. In another instance, while the vehicle is making an S-turn, the vehicle may turn, for example, to the left and then immediately to the right. While the vehicle is turning to the left, the left wheel may be lifted up from the road surface while the right wheel closely contacts the road surface. While the vehicle is turning to the right, the right wheel may be lifted up from the road surface while the left wheel closely contacts the road surface. At a transition point from the left turn to the right turn, both of the wheels may experience substantially no friction from the road surface. Such a transition point may be referred to as a "zero torque point." Because the differential gear assembly needs at least some friction through the wheels for its operation, it may not effectively transmit torque from the engine to the wheels in these circumstances.

In such circumstances, the preload or biasing assembly 740 produces a secondary force load (or non-driveline load) to the differential gear assembly. The preload or biasing assembly 740 exerts an axial force (i.e., a spring force) toward the side gears 720a, 720b. The contact of the second side gear 720b with the second preload hub 745b creates a resistive torque due to the normal force and friction force. In addition, as the cam surfaces 725a, 746a rotate relative to each other, the converging portions of the cam surface 725a of the first side gear 720a can climb the converging portions of the cam surface 746a of the first preload hub 745a. This causes the first side gear 720a and the first preload hub 745a to move apart in the axial direction. This axial motion in turn imparts an increased side load/axial force onto the side surfaces 725b, 746b of the second side gear 720b and the second preload hub 745b in conjunction with an engineered material with a controlled coefficient of friction. These configurations in effect provide a secondary resistive torque that causes the differential gear assembly to port driveline torque to the driven wheels with the ability to absorb this force and transfer it to the ground in an effort to move the vehicle. In a situation where the wheels are at a zero torque point, the preload or biasing assembly 740 allows the differential gear assembly to maintain a base normal force toward the friction washers, thereby enhancing the potential driving performance of the vehicle (e.g., allowing the vehicle to move smoothly when making an S-turn).

In certain embodiments, the preload assembly 740 can be used in combination with the friction plates 150a, 150b of FIG. 2. The preload assembly 740 described above can enhance the resistant force produced by the friction plates 150a, 150b.

As the side gears 720a, 720b ride up on the cam profiles, the applied normal force increases, which increases a bias ratio between the driven wheels as a function of load. The bias ratio can increase to lock-up, at which time the differential gear assembly acts as a spool which provides no differential action between the two half shafts.

The differential gear assembly of the embodiments described above can effectively provide torque to the driven wheels even when the driven wheels experience different road surface conditions. In addition, the response of the differential gear assembly to various road conditions can be tuned by adjusting the response of the system by controlling the normal (separating) force as a function of applied torque load generated therein using different materials with manageable coefficients of friction.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while the number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with, or substituted for, one another in order to perform varying modes of the disclosed invention. Thus, it is intended that the scope of the present invention herein disclosed should not be limited by the particular disclosed embodiments described above, but should be determined only by a fair reading of the claims.

What is claimed is:

1. A differential gear assembly comprising:
   a first sun gear and a second sun gear spaced apart from each other and coaxially aligned with each other, the first sun gear including a first surface facing the second sun gear, the second sun gear including a second surface facing the first sun gear; and
   a preload member interposed between the first sun gear and the second sun gear, the preload member including a third surface facing the first sun gear and a fourth surface facing the second sun gear,
   wherein each of the first and third surfaces has a cam profile,
   wherein relative rotational movement of said first surface and said third surface causes axial movement of said first sun gear and said second sun gear,
   wherein the second and fourth surfaces can rotate relative to each other,
   wherein the second and fourth surfaces are substantially planar, and
   wherein a portion of said first surface forms a continuous curve and a portion of said third surface forms a continuous curve, and, in operation, said portion of said first surface slides along said portion of said third surface.

2. The assembly of claim 1, wherein the cam profiles of the first and third surfaces are complementary.

3. The assembly of claim 2, wherein the first surface has a rise of about 0.05 mm to about 0.15 mm.

4. The assembly of claim 2, wherein complementary portions of the first and third surfaces are curvilinear.

5. The assembly of claim 1, wherein the preload member comprises a first preload hub, a second preload hub, and a spring pack interposed between the first and second preload hubs.

6. The assembly of claim 1, wherein the fourth surface has a friction coefficient of about 0.01 to about 0.70.

7. A method of operating a differential gear assembly, the method comprising:
   providing a vehicle comprising the differential gear assembly of claim 1;
   rotating the preload assembly relative to the second sun gear while the first sun gear is not rotating relative to the preload assembly; and
   rotating the preload assembly relative to the first sun gear while the second sun gear is rotating relative to the preload assembly.

8. A differential gear assembly comprising:
   a first sun gear and a second sun gear spaced apart from each other and coaxially aligned with each other, the first sun gear including a first surface facing the second sun gear, the second sun gear including a second surface facing the first sun gear; and
   a preload member interposed between the first sun gear and the second sun gear, the preload member including a third surface facing the first sun gear and a fourth surface facing the second sun gear;
   wherein the first and third surfaces are shaped to cause said first sun gear and said second sun gear to move away from each other in response to relative rotational movement of said first sun gear and said preload member,
   wherein the fourth surface forms a substantially planar frictional surface,
   wherein the first and third surfaces have profiles complementary to each other,
   wherein the second surface is substantially planar, and
   wherein the first and third surfaces include portions complementary to each other, are curvilinear, containing a curved section and, in operation, the portions slide along one another.

9. The assembly of claim 8, wherein the preload member comprises a spring configured to provide an axial force toward the first and second sun gears.

* * * * *